Patented Sept. 25, 1951

2,569,323

UNITED STATES PATENT OFFICE 2,569,323

METHOD OF MAKING LIGHTWEIGHT AGGREGATE

Poole Maynard, Atlanta, Ga.

No Drawing. Application April 25, 1949, Serial No. 89,555

14 Claims. (Cl. 25—156)

1

The present invention relates generally to the production of a material commonly referred to as lightweight aggregate. This material ordinarily finds its principal utility as a constituent of concrete or similar cementitious mixtures employed in the construction of buildings, roads and the like.

More particularly, this invention relates to the production of a lightweight aggregate of the type described, by means of the bloating of a composition of matter which has heretofore either not been mined from the earth because of its lack of economic value or else has been discarded as a waste by-product in industrial or other mining operations.

In conventional building work such as the construction of concrete walls, precast concrete, concrete block pipe, brick, roadways and the like, it is highly desirable from the engineering standpoint to reduce the weight of the concrete as much as possible, consistent with adequate strength requirements. By use of the material produced in accordance with the present invention, it is possible to construct buildings at 20 to 30 per cent lower cost than is possible where conventional concrete containing the usual gravel or other heavier aggregate is employed. Furthermore, by using a lighter-weight concrete, it is possible to erect buildings with smaller supporting columns, wall and floors, thereby materially reducing the over-all weight of the building and, in addition, eliminating the necessity for considerable expensive steel reinforcing material.

Although it has long been known that the use of various types of lightweight aggregates would result in economies of the type referred to above in building construction, such use has not always been economically feasible for a number of reasons. For instance, known types of lightweight aggregates customarily possess widely varying physical properties so that it is difficult to rely thereon in construction. A notable example of this type is found in the use of cinders which, although quite light in weight, possess a non-uniform crushing strength and are also largely unsuitable for use in concrete products on account of their included impurities, chiefly constituting a certain amount of sulfur which has an adverse action upon the cement. In the case of certain other materials such as, for example, vermiculite, the lightweight aggregates produced therefrom are relatively hygroscopic, thus rendering them largely unsuitable for use in concrete mixtures, particularly in sections of the country where the climate is relatively humid.

2

From still another standpoint, it is frequently not economically feasible to utilize lightweight aggregates on account of the relatively high cost of transportation thereof. Since such lightweight aggregates occupy a relatively large volume of space in proportion to their weight, the cost of transportation is generally prohibitive unless such aggregates can be produced locally either as cinders, bloated blast furnace slag, bloated argillaceous material or the like. Thus, for example, in the State of Florida where none of the conventional sources of lightweight aggregates is readily available, it is preferable to use a locally available gravel or a heavy aggregate, even though such heavy aggregates such as gravel, granite, slag or the like, may weigh as much as 150 to 175 pounds per cubic foot, as compared with the 25 to 30 pounds per cubic foot weight of the lightweight aggregates.

As indicated above, the production and use of other types of so-called lightweight aggregates has been known for many years, and since at least the year 1920, shale or consolidated clay fired and expanded to form haydite, has been so treated after mining by a series of steps, including crushing, screening, drying and firing in a rotary kiln or the like. By means of a different process, blast furnace slag has been treated to produce lightweight material and the bloating treatment has also been applied to rhyolite in manufacturing the product known in trade as perlite.

One of the principal sources of lightweight aggregates has been obtained in the past by the bloating of argillaceous material. A disclosure of a typical method of producing such material is set forth in Patent No. 1,707,395, issued to Stephen J. Hayde, on April 2, 1929, for "Method of Burning Argillaceous Material and Product Resulting Therefrom." An improvement upon the process and material disclosed by Hayde is set forth in Patent No. 2,430,601, issued on November 11, 1947, to John B. Cleary for "Method for Treating Argillaceous Material." The expansion of vermiculite mineral is also known, and the application of heat for bloating such materials as cookeite, culsageite, dudleyite, halite, jefferisite, kerrite, lennilite, lucasite, maconite, painterite, philadelphite, pyrosclerite, zonolite, vaalite and the like is disclosed by Patent No. 2,215,078, issued to C. G. F. Cavadino on September 17, 1940, for "Process for the Manufacture of Fireproof Thermal and Acoustical Insulation Articles." It is apparent, therefore, that although the bloating of such materials is generally old and well known, in no case has the bloating process been applied to a material of the type contemplated by the present invention.

Accordingly, the principal object of the present invention is to provide a novel method of producing a lightweight aggregate material susceptible of various usages of the type outlined generally above.

Another object of the invention is to provide an improved method of treating certain by-products of the phosphate mining industry which are normally discarded as waste.

Other objects and advantages of the invention, as well as a clearer understanding of the precise nature thereof, will become more readily apparent to those skilled in the art from a consideration of the following detailed specification.

In what is probably its broadest aspect, the present invention contemplates the application of a process known as "bloating" to a material which was originally a phosphatic, volcanic ash, for the purpose of producing a lightweight aggregate of general utility. However, in order that the nature of the invention may be more clearly understood, there is set forth herein a detailed explanation covering the application of the process to a typical source of phosphatic, volcanic ash, together with a delineation of the various method steps in preferred sequence and typical chemical analyses of the raw materials employed.

At the outset, it should be understood that although the detailed description set forth below refers to a specific source of the raw material employed, such material is also believed to exist as a natural substance in various deposits quite apart from the "pebble phosphate" formations referred to. However, for the purpose of explanation, the raw material will be assumed to be the "slimes" resulting from the mining of phosphates from the so-called "pebble phosphate" deposits of Florida.

In the mining of phosphates such as the pebble phosphate deposits of Florida the primary purpose of such mining is to produce phosphate materials of suitable form and purity for a variety of uses, such as fertilizer, animal and human food product supplement, and general chemical uses. Referring specifically to the Florida pebble phosphate deposits, the phosphate bed known as "matrix" is made up of "pebbles" larger than 14 mesh together with "concentrates" and the "slimes." All material smaller than 100 mesh is commonly referred to as the "slimes" and the remaining material is known as "concentrates."

The matrix or phosphate deposits may be located anywhere from 5 to 60 feet below the surface of the earth, and at the present time, as a matter of practical economics, where the overburden exceeds around 60 feet, mining has not been found to be practicable. In the Florida pebble phosphate deposits, the matrix is ordinarily less than 60 feet below the surface which latter usually consists principally of sand. The matrix may be mined by means of conventional dragline or crane bucket apparatus which is utilized to gather the sand or other overburden into one pile and the matrix into another pile. Thereafter, the matrix is hydraulically washed to a suitably located sump where it may be picked up by means of pumps and conveyed into suitable apparatus such as a log washer. After leaving the log washer, the material then passes, usually by gravity, to suitable vibrating screens where the pebbles of 14 mesh or greater are separated from the remainder of the material.

The separated pebbles usually constitute approximately 68 to 75 per cent bone phosphate of lime and may include 7 to 8 per cent silica (plus or minus), 2 per cent iron and alumina, as well as a large quantity of water. This direct product of the phosphate mining operation may either be sold in pebble form or as "concentrates" or perhaps treated with sulfuric acid in order to make the material water or citrate soluble, or may be heated with silica in an electric furnace for the purpose of producing phosphoric acid and fluorine which come off as gases at different temperatures.

The principal by-product of the pebble phosphate mining process, as indicated above, is commonly referred to as "slimes." Actually, it is believed that all marine phosphate rocks, known as apatites and containing lime and phosphoric acid with fluorine acting as a binder to hold the material together, are primarily of igneous or volcanic origin. These slimes when pumped to settling ponds have been found to contain approximately 4 to 5 per cent of solid matter mixed with around 95 to 96 per cent of water, and although the material has been erroneously referred to as clay, it is quite clear, from the analyses which have been made, that such terminology is incorrect. In any event, it is apparent that this phosphatic ash has been gradually disintegrated and otherwise altered by such agencies as salt water, by the decomposition of some sulfides, by radioactive mineral or minerals, and possibly by downward circulating acid solutions, since its deposition in association with the pebble phosphate deposits found in Florida.

Of particular importance in the present case is the fact that raw materials of the type which comprise the slimes referred to above have been found to carry sufficient water in combination (commonly referred to as "loss on ignition"), sufficient oxide of iron, and sufficient alkalies, including lime and magnesia, and sufficient apatite or collophane to bloat or gradually expand with the production of many small cells or pockets when heated to temperatures within a range from approximately 1600° F. to around 2100° F.

As specific examples of this phosphatic, volcanic ash, the figures below are typical chemical analyses, on a dry basis, of the slimes produced as by-products in the mining of the pebble phosphate deposits in the American Agricultural Chemical Company fields in Florida. These analyses are also representative of the composition of other slimes obtained from pebble phosphate fields many miles apart, and, despite the fact that certain slimes settle more readily than others which remain in suspension, the analyses in all cases have been found to contain sufficient gas producing materials to bring about adequate bloating when heated. On the other hand, it has been found that in the settling ponds, the free silica or finely divided sand referred to in the chemical analyses would naturally settle out before the acid soluble materials, so that any chemical analysis of the extremely finely divided, suspended matter would naturally be lower in silica. However, such difference in the silica content was found to have substantially no effect upon the bloating properties of the slimes, since the bloating is dependent upon chemical compounds other than sand.

Example I

| | Dry Basis |
|---|---|
| | Per Cent |
| Loss on Ignition (combined water) | 9.31 |
| Phosphoric Acid ($P_2O_5$) | 14.94 |
| Iron Oxide ($Fe_2O_3$) | 6.34 |
| Alumina ($Al_2O_3$) | 18.12 |
| Lime (CaO) | 18.26 |
| Magnesia (MgO) | 0.84 |
| Silica ($SiO_2$) | 31.52 |
| Fluorine ($F_2$) | 0.29 |
| Alkalies ($Na_2O$) | 0.33 |

Example II

| | Dry Basis |
|---|---|
| | Per Cent |
| Loss on Ignition (combined water) | 9.31 |
| Phosphoric Acid ($P_2O_5$) | 6.06 |
| Iron Oxide ($Fe_2O_3$) | 2.88 |
| Alumina ($Al_2O_3$) | 18.12 |
| Lime (CaO) | 17.35 |
| Magnesia (MgO) | 0.84 |
| Silica ($SiO_2$) | 30.04 |
| Fluorine ($F_2$) | 0.29 |
| Alkalies ($Na_2O$) | 0.33 |

Example III

| | Dry Basis |
|---|---|
| | Per Cent |
| Loss on Ignition (combined water) | 11.62 |
| Phosphoric Acid ($P_2O_5$) | 14.20 |
| Iron Oxide ($Fe_2O_3$) | 6.34 |
| Alumina ($Al_2O_3$) | 28.81 |
| Lime (CaO) | 18.78 |
| Magnesia (MgO) | 1.26 |
| Silica ($SiO_2$) | 31.52 |
| Fluorine ($F_2$) | 0.80 |
| Alkalies ($Na_2O$) | 0.33 |

The following chemical analysis represents a typical average of settling pond slimes similar to those referred to in the above specific examples and illustrates a typical range of percentages of the various materials computed upon a dry basis:

Example IV

| | Dry Basis |
|---|---|
| | Per Cent |
| Loss on Ignition (combined water) | 9 –12 |
| Phosphoric Acid ($P_2O_5$) | 6 –15 |
| Iron Oxide ($Fe_2O_3$) | 2 – 7 |
| Alumina ($Al_2O_3$) | 18 –29 |
| Lime (CaO) | 17 –19 |
| Magnesia (MgO) | 0.80– 1.30 |
| Silica ($SiO_2$) | 30 –32 |
| Fluorine ($F_2$) | 0.20– 1.00 |
| Alkalies ($Na_2O$) | 0.30– 0.40 |

These chemical analyses have also indicated that the slimes contain a small amount of carbonate and that only a small amount of the phosphoric acid is citrate soluble. The acid insoluble material from a number of samples utilized in determining the above analyses averages out to be approximately 34.40 per cent.

Various spectographic analyses which have been made of the same slimes utilized in determining the above chemical analyses show, in addition to the elements listed in the chemical analyses, the presence of small amounts or traces of manganese, chromium, vanadium, barium, strontium and titanium. However, it should be pointed out that these spectrographic analyses did not cover the entire band of the spectrum, so that traces of other elements might well be present.

In addition to the chemical and spectrographic analyses, various microscopic studies have been made which clearly reveal the presence of certain crystalline materials in the slimes. For example, these microscopic studies reveal the presence of crystals which have the appearance and index of refraction of apatite and also collophane, which latter is an altered hydrous product related to apatite in much the same manner as bauxite is related to clay, and containing water of crystallization. In addition, it appears that the slimes contain small crystals of numerous other substances such as halloysite, albite, and microlene, as well as the secondary minerals sericite, dolomite and kaolinite.

It should be pointed out that the "slimes" which are referred to as the raw material in the practice of the present invention, constitute a very fine-grain material, and the percentage of quartz is dependent largely upon the method of processing which is followed in separating the so-called phosphate concentrates from the slimes. It may also be noted that although a portion of the slimes usually does not settle very readily, this may be due to the presence of a variable quantity of alumina which is not combined with the silica.

It is important to note that the above analyses show very definitely that the slimes are in no sense clays, and may not properly be referred to as argillaceous material. Taking a typical example, it will be noted that since only approximately 31.52 per cent of the slimes is silica, only around 2.88 per cent of the contained alumina can be combined with this silica to form an aluminum silicate. This follows from the fact that only 34.40 per cent of the total chemical compounds in the slimes are insoluble, whereas substantially the entire remainder is acid soluble. Although not definitely known, it is believed that the chemical, petrographic and spectrographic analyses of the slimes are clear evidence of their volcanic origin, and a study of the geology of the various phosphate deposits indicates that the slimes actually had their origin from oceanic volcanoes, as for example, in the West Indies and Gulf areas.

Referring now specifically and in detail to the raw material constituting the slimes produced as a by-product in the mining of pebble phosphate deposits, a preferred method of treating such material to produce a lightweight aggregate may be described as follows:

In general, the process of producing or manufacturing this lightweight aggregate commences with a mining step in which the raw material is either mined from the settling ponds by a dragline or other economical method, or is obtained directly from the separation of the slimes from the phosphate concentrates. After the slimes have thus been initially obtained, they are settled in any of a number of ways, such as by merely heating to boiling temperature or by the addition of alkali or other chemicals to form a flocculate to eliminate the excess uncombined water therefrom.

After the slimes have been suitably dehydrated or reduced to a total water content of approximately 50 to 60 per cent, they are then preferably subjected to a suitable pelletizing or pugging operation in order to consolidate them. In a laboratory operation, the material can actually be rolled into small pellets between the palms of the hands, while in commercial operations, a conventional pugging machine may be employed of the type commonly used in brick manufacture. This consolidation, either in the form of pellets or preferably as circular pugged briquettes, is highly desirable, for the principal reason that the subsequent bloating step is effected largely as a result of the generation of certain gases produced by heating the material, and during such heating, the outside of the pellet or briquette will be at a higher temperature than the inside. Thus, as the higher temperatures are reached, the outer layer of each individual pellet or briquette will be at least partially sealed by incipient fusion or vitrification, thereby at least partially preventing the generated gases from escaping and causing the material to bloat or expand with the formation of minute cells or gas pockets within each briquette.

After the material has been consolidated, it is extruded under pressure through a suitable die which is preferably from one-quarter to one inch in diameter but which may be as large as three inches or more and is then cut with a wire or other equivalent device as it leaves the die. Preferably, the die is shaped in such manner as to extrude a rounded or triangular bar, as this has been found to be better adapted to large-scale manufacture. It may also be noted that the cutting wire employed may be identical or similar to that used in cutting the extruded bar in brick making.

After the extruded material has been cut from the bar to form suitable briquettes, it is then fed in any convenient manner to a furnace for the application of the necessary heat to cause bloating. This furnace is preferably gas or oil fired, and it has been found that a furnace of the rotary kiln type gives very satisfactory results. Dried pellets or extruded briquettes can also be fired in sintering equipment. It has been found in practice that this improved material has a relatively long firing period covering a range of temperatures extending from the temperature at which bloating begins to that at which the bloating ends and fusion or vitrification begins. This, of course, constitutes a particularly desirable characteristic of the raw material which lends itself quite readily to processing in the rotary kiln. As a matter of fact, it is probably due largely to this particular property that the usual difficulties encountered in processing clays or shales, as in the haydite process, are avoided. In other words, in using the present material, there does not appear to be any tendency for the material to form into large balls while in the rotary kiln, and of course, the principal reason for the pugging operation is to densify the material and to provide particles of fairly uniform size in order to secure effective bloating.

Although there does not appear to be any very critical time element or ambient pressure range for completion of the firing operation, it has been observed that after the slimes have been heated to about 1600° F., they should gradually pass with continued heating through a temperature range of between 1600° F. to around 2100° F. The total time required for this operation after the material has reached a temperature of around 1600° F. is preferably about 10 minutes, although this may be varied to a certain extent, depending upon firing conditions.

The briquettes which are fed to the kiln should preferably be of approximately the same size. Under certain conditions, it may be found that some sticking will take place as the briquettes or pellets are fed to the drier or rotary kiln, and under these circumstances, a fine sand may be fed to the briquettes as they enter the kiln in order to coat them and thereby prevent sticking. As previously mentioned, it is possible to use an extrusion die of three inches or larger diameter, and in such case, the resultant material may be crushed after burning. Furthermore, the relatively fine material which results from breakage during the bloating operation may be used as a lightweight sand and may be mixed with the crushed, large-size bloated particles and screened to prepare such a product.

After the material has been fired in the kiln, it normally is in the form of irregularly shaped pellets of various colors such as blue, brown, red and the like, although the color of the resultant product can, of course, be controlled by suitably regulating the nature of the atmosphere within the kiln. Where the material has been consolidated under mechanical pressure, as in a pug mill, in order to produce a uniform gas action during bloating, the resultant product will weigh around 25 to 30 pounds per cubic foot and can be used whereever lightweight aggregates of this type have a market. The gases which cause bloating are probably a mixture of water vapor, oxygen, sulfides, carbon dioxide and impurities, and it is believed that the bloating of the material within a commercially feasible temperature range is made possible principally by the fusion of the iron oxide at the outer surface of the particles which fuses at a relatively low temperature.

It is to be particularly noted in connection with the material employed in the practice of the present invention that this phosphatic, volcanic ash is in no way similar to clay, shale, blast furnace slag or rhyolite. The bloating of the material in accordance with the present invention, as previously mentioned, is probably due largely to the escape of carbon dioxide gas which is generated when the material is heated to the proper temperature and results from the fact that when the material is properly consolidated, as in a pug mill or the like, and extruded, the gas expands rather slowly. On the other hand, a relatively rapid loss of the carbon dioxide gas would, of course, act to prevent adequate bloating. Furthermore, it is well known that clays which bloat usually require a temperature of at least 2200° to 2400° F., whereas the material employed in the practice of the present invention bloats at a much lower temperature of 1600° to 2100° F.

Although numerous uses other than those specifically referred to herein will undoubtedly suggest themselves to those skilled in the art, it may be pointed out that this improved, lightweight aggregate may be used to advantage in various cast stone products. Thus, by the use of a rubbing bed, various color effects may be employed to commercial advantage in the production of panel materials and the like. Furthermore, the improved material may be crushed in suitable sizes for use as an insulating product either alone or in combination with various plasters.

Obviously, numerous other modifications, alterations and deviations from the specific materials and process steps disclosed herein solely for the purpose of illustration will occur to those skilled in the art without departing from the spirit or scope of the invention as set forth in the appended claims.

Having thus described my invention, what I claim as novel and desire to secure by Letters Patent of the United States is:

1. The method of producing a lightweight aggregate from a hydrated, phosphatic, volcanic ash material having approximately the following composition:

|  | Dry Basis |
| --- | --- |
|  | Per cent |
| Loss on Ignition (combined water) | 9.31 |
| Phosphoric Acid ($P_2O_5$) | 14.94 |
| Iron Oxide ($Fe_2O_3$) | 6.34 |
| Alumina ($Al_2O_3$) | 18.12 |
| Lime (CaO) | 18.26 |
| Magnesia (MgO) | 0.84 |
| Silica ($SiO_2$) | 31.52 |
| Fluorine ($F_2$) | 0.29 |
| Alkalies ($Na_2O$) | 0.33 | which comprises settling said material to remove the excess uncombined water therefrom, consolidating said material in a pug mill, extruding said material through a die of approximately ¼" diameter to form a rounded bar, cutting said bar into pellets, sanding said pellets to provide a surface coating thereon, firing said pellets in a rotary kiln for around 10 minutes at a temperature of approximately 1600° F. to 2100° F., and crushing the bloated pellets into a finely divided form.

2. The method of producing a lightweight aggregate from a hydrated, phosphatic, volcanic ash material having approximately the following compositions:

|  | Dry Basis |
| --- | --- |
|  | Per cent |
| Loss on Ignition (combined water) | 9.31 |
| Phosphoric Acid ($P_2O_5$) | 6.06 |
| Iron Oxide ($Fe_2O_3$) | 2.88 |
| Alumina ($Al_2O_3$) | 18.12 |
| Lime (CaO) | 17.35 |
| Magnesia (MgO) | 0.84 |
| Silica ($SiO_2$) | 30.04 |
| Fluorine ($F_2$) | 0.29 |
| Alkalies ($Na_2O$) | 0.33 | which comprises settling said material to remove the excess uncombined water therefrom, consolidating said material in a pug mill, extruding said material through a die of approximately 3" diameter to form a rounded bar, cutting said bar into briquettes, sanding said briquettes to provide a surface coating thereon, firing said briquettes in a rotary kiln for around 10 minutes at a temperature of approximately 1600° F. to 2100° F., and crushing the bloated briquettes into a finely divided form.

3. The method of producing a lightweight aggregate from a hydrated, phosphatic, volcanic ash material having approximately the following composition:

|  | Dry Basis |
| --- | --- |
|  | Per cent |
| Loss on Ignition (combined water) | 11.62 |
| Phosphoric Acid ($P_2O_5$) | 14.20 |
| Iron Oxide ($Fe_2O_3$) | 6.34 |
| Alumina ($Al_2O_3$) | 28.81 |
| Lime (CaO) | 18.78 |
| Magnesia (MgO) | 1.26 |
| Silica ($SiO_2$) | 31.52 |
| Fluorine ($F_2$) | 0.80 |
| Alkalies ($Na_2O$) | 0.33 | which comprises settling said material to remove the excess uncombined water therefrom, consolidating said material in a pug mill, extruding said material through a die of approximately 3" diameter to form a rounded bar, cutting said bar into briquettes, sanding said briquettes to provide a surface coating thereon, firing said briquettes in a rotary kiln for around 10 minutes at a temperature of approximately 1600° F. to 2100° F., and crushing the bloated briquettes into a finely divided form.

4. The method of producing a lightweight aggregate from a hydrated, phosphatic, volcanic ash material having approximately the following composition:

|  | Dry Basis |
| --- | --- |
|  | Per cent |
| Loss on Ignition (combined water) | 9 –12 |
| Phosphoric Acid ($P_2O_5$) | 6 –15 |
| Iron Oxide ($Fe_2O_3$) | 2 – 7 |
| Alumina ($Al_2O_3$) | 18 –29 |
| Lime (CaO) | 17 –19 |
| Magnesia (MgO) | 0.80– 1.30 |
| Silica ($SiO_2$) | 30 –32 |
| Fluorine ($F_2$) | 0.20– 1.00 |
| Alkalies ($Na_2O$) | 0.30– 0.40 | which comprises settling said material to remove the excess uncombined water therefrom, consolidating said material in a pug mill, extruding said material to form a bar, cutting said bar into briquettes, sanding said briquettes to provide a surface coating thereon, firing said briquettes in a rotary kiln for around 10 minutes at a temperature of approximately 1600° F. to 2100° F., and crushing the bloated briquettes into a finely divided form.

5. The method of producing a lightweight aggregate from hydrated, phosphatic, volcanic ash material which comprises settling said material to remove the excess uncombined water therefrom, consolidating said material in a pug mill, extruding said material through a die of approximately 3" diameter to form a rounded bar, cutting said bar into briquettes, sanding said briquettes to provide a surface coating thereon, firing said briquettes in a rotary kiln for around 10 minutes at a temperature of approximately 1600° F. to 2100° F., and crushing the bloated briquettes into a finely divided form.

6. The method of producing a lightweight aggregate from a hydrated, phosphatic, volcanic ash material which comprises settling said material to remove the excess uncombined water therefrom, consolidating said material in a pug mill, extruding said material through a die to form a bar, cutting said bar into pellets, sanding said pellets to provide a surface coating thereon, and bloating said pellets by firing for around 10 minutes at a temperature of approximately 1600° F. to 2100° F.

7. The method of producing a lightweight aggregate from a hydrated, phosphatic, volcanic ash material which comprises consolidating said material, extruding said material to form a bar, cutting said bar into pellets, and bloating said pellets by firing at a temperature of approximately 1600° F. to 2100° F.

8. The method of producing a lightweight aggregate from a phosphatic, volcanic ash material which comprises consolidating said material in the form of pellets and bloating said pellets by firing through a temperature range from about 1600° F. to 2100° F.

9. The method of producing a lightweight aggregate from a phosphatic, volcanic ash material which comprises consolidating said material into the form of pellets and heating said pellets to cause the material to bloat.

10. The method of producing a lightweight aggregate which comprises heating a phosphatic, volcanic ash material to cause the material to bloat.

11. A lightweight aggregate produced in accordance with the method set forth in claim 1.

12. A lightweight aggregate produced in accordance with the method set forth in claim 5.

13. A lightweight aggregate produced in accordance with the method set forth in claim 8.

14. A lightweight aggregate produced in accordance with the method set forth in claim 10.

POOLE MAYNARD.

REFERENCES CITED

The following references are of record in the file of this patent:

UNITED STATES PATENTS

| Number | Name | Date |
|---|---|---|
| 1,751,163 | Loessin | Mar. 18, 1930 |
| 1,877,136 | Lee | Sept. 13, 1932 |
| 1,920,773 | Walton | Aug. 1, 1933 |
| 2,015,381 | Harding | Sept. 24, 1935 |
| 2,136,793 | Gabeler et al. | Nov. 15, 1938 |
| 2,304,382 | Shoeld | Dec. 8, 1942 |
| 2,313,746 | Heany | Mar. 16, 1943 |
| 2,478,757 | Foster | Aug. 9, 1949 |